(12) United States Patent  
Nguyen

(10) Patent No.: US 9,217,837 B2  
(45) Date of Patent: Dec. 22, 2015

(54) LATCH MECHANISM FOR COMMUNICATIONS MODULE

(71) Applicant: FINISAR CORPORATION, Sunnyvale, CA (US)

(72) Inventor: Long Nguyen, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 163 days.

(21) Appl. No.: 13/672,396

(22) Filed: Nov. 8, 2012

(65) Prior Publication Data

US 2014/0078681 A1 Mar. 20, 2014

Related U.S. Application Data

(60) Provisional application No. 61/701,627, filed on Sep. 15, 2012.

(51) Int. Cl.
*H05K 7/16* (2006.01)
*G02B 6/42* (2006.01)

(52) U.S. Cl.
CPC ............ *G02B 6/4246* (2013.01); *G02B 6/4261* (2013.01)

(58) Field of Classification Search
CPC ...................................................... G02B 6/4261
See application file for complete search history.

(56) References Cited

U.S. PATENT DOCUMENTS

| | | | | |
|---|---|---|---|---|
| 6,746,158 B2 * | 6/2004 | Merrick | ........................... | 385/53 |
| 6,749,448 B2 * | 6/2004 | Bright et al. | .................. | 439/160 |
| 6,851,867 B2 * | 2/2005 | Pang et al. | ....................... | 385/88 |
| 6,979,213 B1 * | 12/2005 | Mauney et al. | ............... | 439/157 |
| 7,090,523 B2 * | 8/2006 | Shirk et al. | ..................... | 439/352 |
| 7,264,406 B1 * | 9/2007 | Yoshikawa | ....................... | 385/88 |
| 7,278,869 B1 * | 10/2007 | Bernhart et al. | ............. | 439/310 |
| 7,347,711 B1 * | 3/2008 | Bianchini et al. | ............. | 439/357 |
| 7,643,720 B2 * | 1/2010 | Kim et al. | ..................... | 385/134 |
| 8,035,975 B2 * | 10/2011 | Wu | ............................... | 361/747 |
| 2003/0171016 A1 | 9/2003 | Bright et al. | | |
| 2008/0247762 A1 | 10/2008 | Yoshikawa et al. | | |
| 2008/0248683 A1 | 10/2008 | Kim et al. | | |
| 2011/0080008 A1 | 4/2011 | Teo et al. | | |
| 2012/0027362 A1 | 2/2012 | Yi | | |

OTHER PUBLICATIONS

International Search Report and Written Opinion mailed Dec. 16, 2013 in related PCT Application No. PCT/US2013/059806.

* cited by examiner

*Primary Examiner* — Adrian S Wilson
*Assistant Examiner* — Izak Baranowski
(74) *Attorney, Agent, or Firm* — Maschoff Brennan

(57) ABSTRACT

In an example embodiment, a module latch mechanism includes a follower and a driver. The follower is configured to be slidingly positioned relative to a housing and to facilitate selective engagement of the housing with a host device. The follower includes a retaining member configured to retain a resilient member in at least one direction such that the resilient member urges the follower towards a first position relative to the housing. The driver is configured to be rotatingly positioned relative to the housing. The driver includes a cam configured to urge the follower towards a second position relative to the housing as the driver is rotated from a latched position to an unlatched position.

19 Claims, 9 Drawing Sheets

LATCH MECHANISM FOR COMMUNICATIONS MODULE

CROSS-REFERENCE TO RELATED APPLICATIONS

This application claims priority to U.S. Provisional Application No. 61/701,627, filed Sep. 15, 2012, titled LATCH MECHANISM FOR COMMUNICATIONS MODULE, which is incorporated herein by reference in its entirety.

BACKGROUND

1. Field

The embodiments discussed herein relate generally to communications modules. More particularly, example embodiments relate to latch mechanisms for selectively engaging communications modules with a housing of a host device.

2. Relevant Technology

Communication modules, such as electronic or optoelectronic transceiver or transponder modules, are increasingly used in electronic and optoelectronic communication. Some modules are pluggable, which permits the module to be inserted into and removed from a housing of a host device, such as a host computer, switching hub, network router, or switch box. Latching mechanisms within the housing of the host device may be made to physically secure an inserted communication module into place. To remove the communication module, the latching mechanism may be manipulated to physically unsecure the communication module.

The subject matter claimed herein is not limited to embodiments that solve any disadvantages or that operate only in environments such as those described above. Rather, this background is only provided to illustrate one exemplary technology area where some embodiments described herein may be practiced

SUMMARY

These and other limitations are overcome by embodiments of the invention which relate to systems for latch mechanisms for selectively engaging communications modules with a housing of a host device.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a module latch mechanism includes a follower and a driver. The follower is configured to be slidingly positioned relative to a housing and to facilitate selective engagement of the housing with a host device. The follower includes a retaining member configured to retain a resilient member in at least one direction such that the resilient member urges the follower towards a first position relative to the housing. The driver is configured to be rotatingly positioned relative to the housing. The driver includes a cam configured to urge the follower towards a second position relative to the housing as the driver is rotated from a latched position to an unlatched position.

In another example embodiment, a module includes a housing, a substantially planar resilient member, and a module latch. The housing includes a protrusion. The module latch includes a follower and a driver. The follower includes a retaining member and an interfacing protrusion. The follower is configured to be slidingly positioned relative to the housing. The follower is further configured to facilitate selective engagement of the housing with a host device. The driver is configured to be rotatingly positioned relative to the housing. The driver includes a cam configured to interface with the interfacing protrusion of the follower such that the driver urges the follower towards a second position relative to the housing as the driver is rotated from a latched position to an unlatched position. The protrusion of the housing and the retaining member of the follower are configured to retain portions of the resilient member such that the resilient member urges the follower towards a first position relative to the housing and is resiliently deformed as the follower is urged towards the second position relative to the housing.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Figure 1:
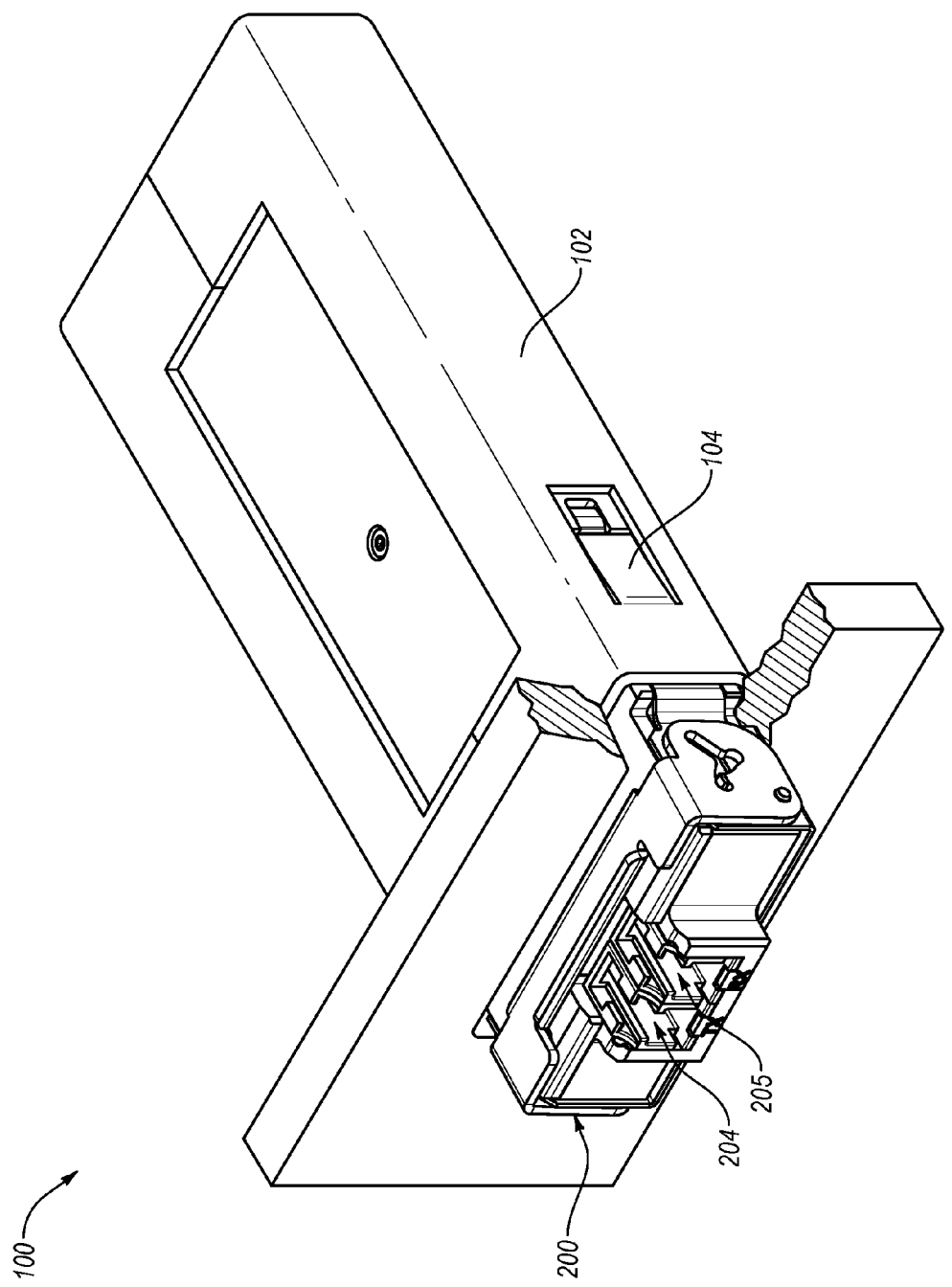
FIG. 1 is a top perspective view of portions of an example host device and an example optoelectronic module in a latched configuration and inserted into the example host device.

Example embodiments relate to latch mechanisms for selectively engaging communications modules with a housing of a host device and to selectively engageable communication modules that include such latch mechanisms. Some embodiments of the latch mechanism disclosed herein enable a communication module to be selectively engaged with a housing of a host device. Embodiments described herein may include fewer and/or less complex parts, and may allow for simplified assembly compared to traditional latch mechanisms. For at least these reasons, embodiments of the latch mechanism may be less expensive and/or less expensive to implement with communication modules than traditional latch mechanisms.

Some example embodiments of the latch mechanism disclosed herein further allow communications cables to remain plugged into the communications modules as the latch mechanism is operated. Thus, embodiments of the latch mechanism may allow communications modules to be disengaged from the housing of the host device without unplugging communications cables from the communications modules. Leaving the communications cables plugged into the communications modules as the communications modules are removed from a housing of a host device may provide several advantages. For example, a removed communications module may be relocated to another housing of another host device without a risk of reversing the communications cables. If the removed communications module is to be replaced, communications cables may be relocated to the replaced communications module directly from the removed communications module, possibly speeding up the replacement process and/or reducing the likelihood of reversing the communications cables.

Reference will now be made to the drawings wherein like structures will be provided with like reference designations. It should be understood that the drawings are diagrammatic and schematic representations of example embodiments and, accordingly, are not limiting of the scope of the present invention, nor are the drawings necessarily drawn to scale. It should also be understood that many of the features of the disclosed embodiments may be substantially symmetrical and a pluralized reference to a feature may refer to a pair of similar features of which only one may be labeled in the drawings.

1. Example Host Device and Communications Module

FIG. 1 is a top perspective view of portions of an example host device 100 and an example optoelectronic module 200 in a latched configuration and inserted into the example host device 100. In general, the optoelectronic module 200 may be employed in the communication of optical signals in connection with the host device 100 being employed in the communication of corresponding electrical signals.

The optoelectronic module 200 may include a transmit port 204 and a receive port 205 at a front of the optoelectronic module 200. The optoelectronic module 200 can be configured for optical signal transmission and reception via the transmit port 204 and the receive port 205 at a variety of data rates including, but not limited to, 1.25 Gb/s, 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s, or higher. Furthermore, the optoelectronic module 200 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic module 200 can be configured to support various communication protocols including, but not limited to, Optical Fast Ethernet, Optical Gigabit Ethernet, 10 Gigabit Ethernet, and 1×, 2×, 4×, 8×, and 16× Fibre Channel. In addition, although one example of the optoelectronic module 200 is configured to have a form factor that is substantially compliant with the CFP2 MSA, the module 200 can alternatively be configured in a variety of different form factors that are substantially compliant with other MSAs including, but not limited to, the CFP MSA, the CFP4 MSA, the QSFP MSA, the XFP MSA, the SFP MSA, or the SFP+ MSA. Finally, although the optoelectronic module 200 is illustrated as a pluggable optoelectronic transceiver module, example embodiments of the latching mechanism disclosed herein can alternatively be employed, for example, in connection with pluggable electronic transceiver modules, other pluggable electronic devices such as pluggable media drives, or the like.

The host device 100 may include a cage 102 configured to be connected to a host printed circuit board (not shown). The cage 102 is configured to at least partially receive the optoelectronic module 200. The cage 102 includes a pair of inwardly biased leaf springs 104 located on opposite sides of the cage 102. Although the leaf springs are inwardly biased, the leaf springs do not substantially impede the insertion of the optoelectronic module 200 into the host device cage. The leaf springs 104 extend away from a front of the cage 102 where the optoelectronic module 200 is at least partially received. The host device 100 generally forms an electrical connection to the optoelectronic module 200 through which electrical signals may be communicated between the host device 100 and the optoelectronic module 200.

Figure 2A:
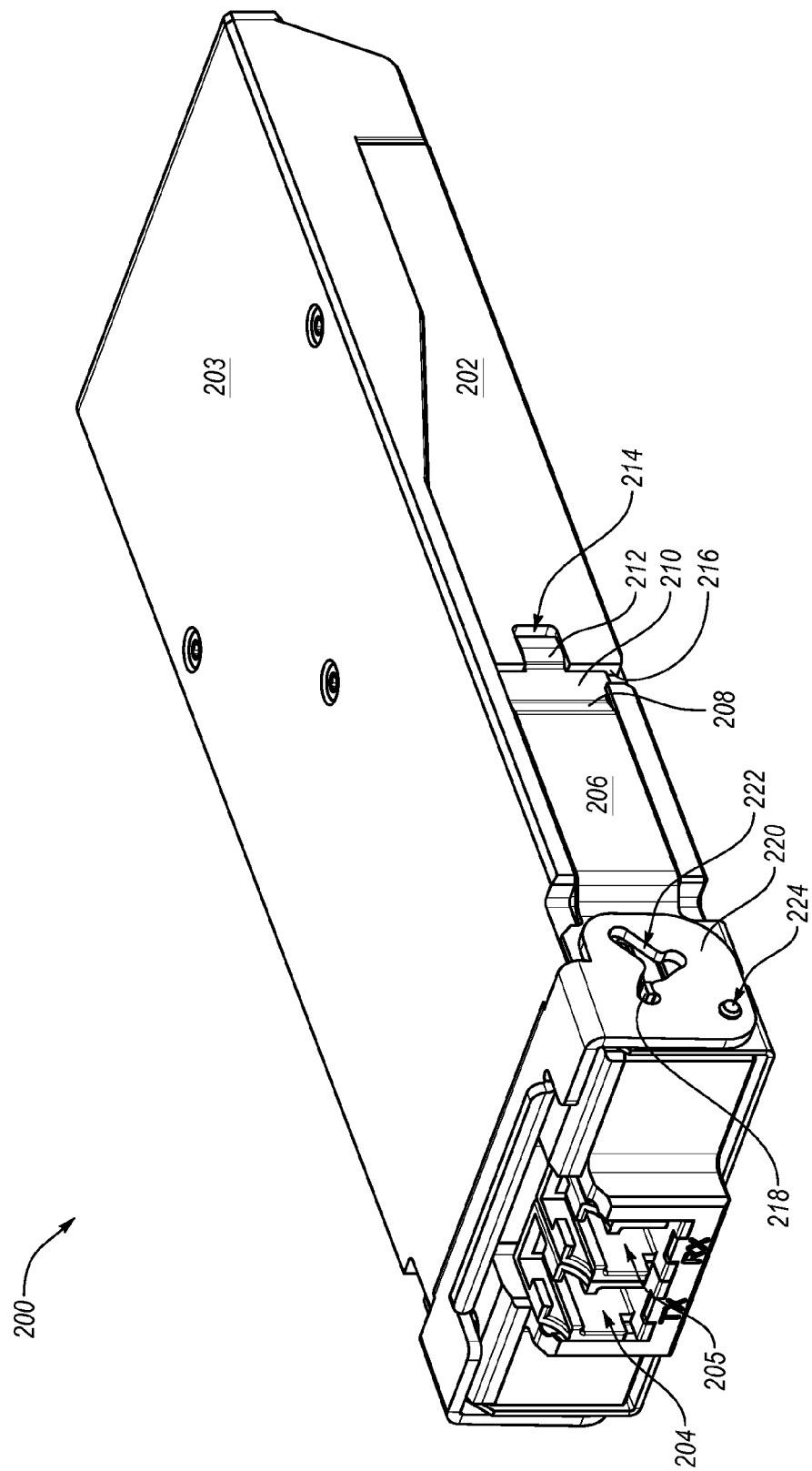
FIG. 2A is a top perspective view of the example optoelectronic module of FIG. 1 with the portions of the example host device omitted.

FIG. 2A is a top perspective view of the example optoelectronic module 200 of FIG. 1 with the portions of the example host device 100 omitted. The optoelectronic module 200 is shown in a "latched" configuration. The example optoelectronic module 200 includes a bottom housing 202 and a top housing 203. Together, the bottom housing 202 and the top housing 203 form what may be generally referred to as a housing of the optoelectronic module 200. The bottom housing 202 and/or the top housing 203 may at least partially surround receiver and/or transmitter circuitry (not shown), including a printed circuit board having an edge connector (not shown) configured to be electrically coupled to the host device. The bottom housing 202 and/or the top housing 203 may be die cast in zinc. Alternately or additionally, the bottom housing 202 and/or the top housing 203 may be die cast, or otherwise manufactured, from other suitable materials or a combination of other suitable materials.

2. Example Latching Mechanism

As disclosed in FIG. 2A, the optoelectronic module 200 includes a driver 220 and a follower 206. The driver 220 and the follower 206 may be formed in various ways, including being stamped from metal or molded from hard plastic.

The follower 206 is configured to be slidingly positioned relative to the bottom housing 202 and top housing 303. The follower 206 is shown in a first position relative to the housing. The follower 206 includes a pair of follower arms on opposite sides of the bottom housing 202. The follower arms include recesses 210. The follower arms may further include bends 208 connected to the recesses 210. The recesses 210, the bottom housing 202, and the top housing 303 are configured such that the leaf springs of the host device cage (as disclosed in FIG. 1) may fit at least partially within the recesses 210 when the optoelectronic module 200 is in the latched configuration.

The bottom housing 202 includes shoulders 216 adjacent to the recesses 210. The shoulders 216 are configured to at least partially abut the leaf springs when the leaf springs are within the recess 210. When the optoelectronic module 200 is in the latched configuration, the engagement of the shoulders 216 and the leaf springs act to prevent the optoelectronic module 200 from moving significantly within the cage (as disclosed in FIG. 1). As a result, the electrical connection between the optoelectronic module 200 and the host device may be maintained and unintentional disconnection can be reduced, if not eliminated.

The follower arms may include fingers 214 that extends beyond the shoulders 216 when the optoelectronic module 200 is in the latched configuration. The fingers 214 may include ramped surfaces 212. When the optoelectronic module 200 is moved from a latched configuration to an unlatched configuration, the fingers 214 and ramped surfaces 212 act to move the leaf springs such that the optoelectronic module 200 may be removed from the host device cage. Moving the optoelectronic module 200 from a latched configuration to an unlatched configuration is generally accomplished when the driver 220 is rotated from a latched position (as shown in FIGS. 1 and 2A-2C) to an unlatched position (as shown in FIGS. 2D and 2E). Moving the optoelectronic module 200 from the latched configuration to the unlatched configuration is disclosed in additional detail below.

Figure 2B:
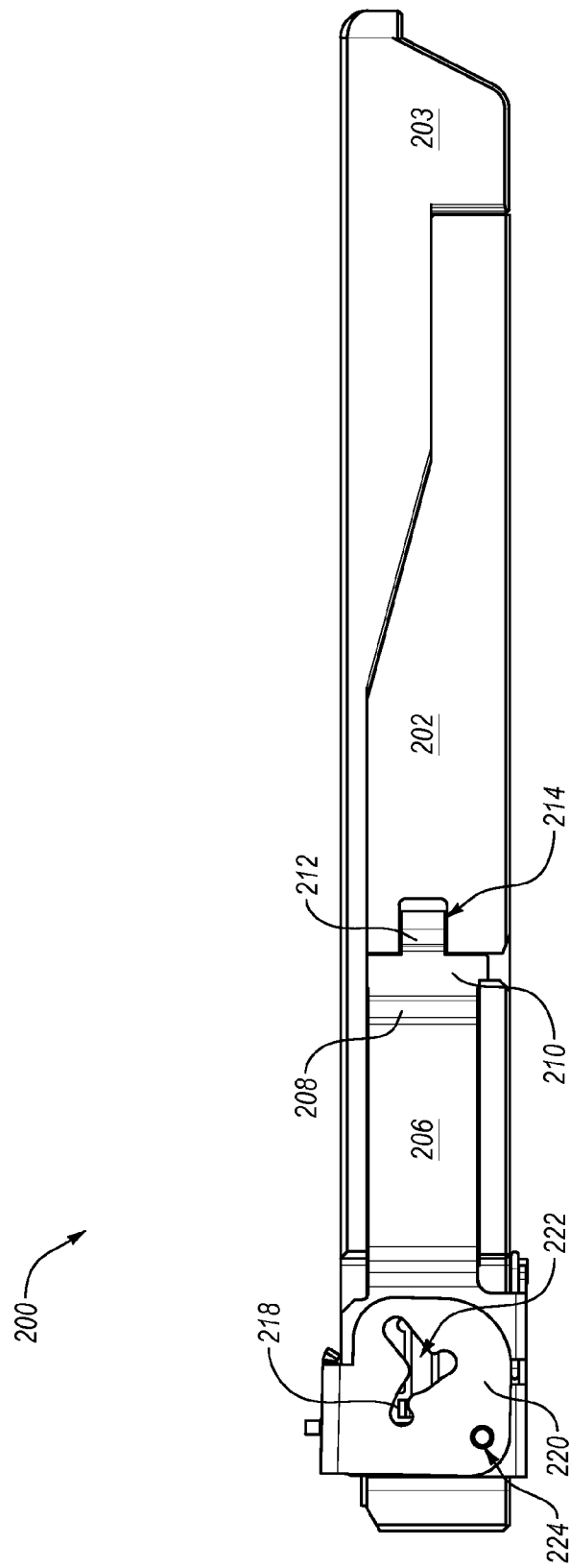
FIG. 2B is a side view of the example optoelectronic module of FIG. 2A.

FIG. 2B is a side view of the example optoelectronic module of FIG. 2A. The driver 220 is configured to be rotatingly positioned relative to the bottom housing 202. The driver 220 includes flanged protrusions 224 configured to be received by flanged openings (shown in FIG. 3) of the bottom housing 202. The flanged protrusions 224 and the flanged openings are disclosed in additional detail below.

As disclosed in FIG. 2B, the driver 220 includes a cam formed from a surface of interfacing openings 222. The surfaces of the interfacing openings 222 are shaped to engage interfacing protrusions 218 of the follower 206 such that the follower 206 is urged towards a second position relative to the housing (as shown in FIG. 2D) as the driver 220 is rotated from a latched position to an unlatched position. The surfaces of the interfacing openings 222 are further shaped to engage the interfacing protrusions 218 such that the follower 206 is urged towards the first position relative to the housing (as shown in FIG. 2B) as the driver 220 is rotated from the unlatched position to the latched position. The interfacing protrusions 218 may generally slide against the corresponding surfaces of the interfacing openings 222 during rotation of the driver 220 in order to cause sliding of the follower 206 relative to the housing. The interfacing openings 222 may further include assembly recesses and detents, disclosed below with reference to FIGS. 6 and 7.

Figure 2C:
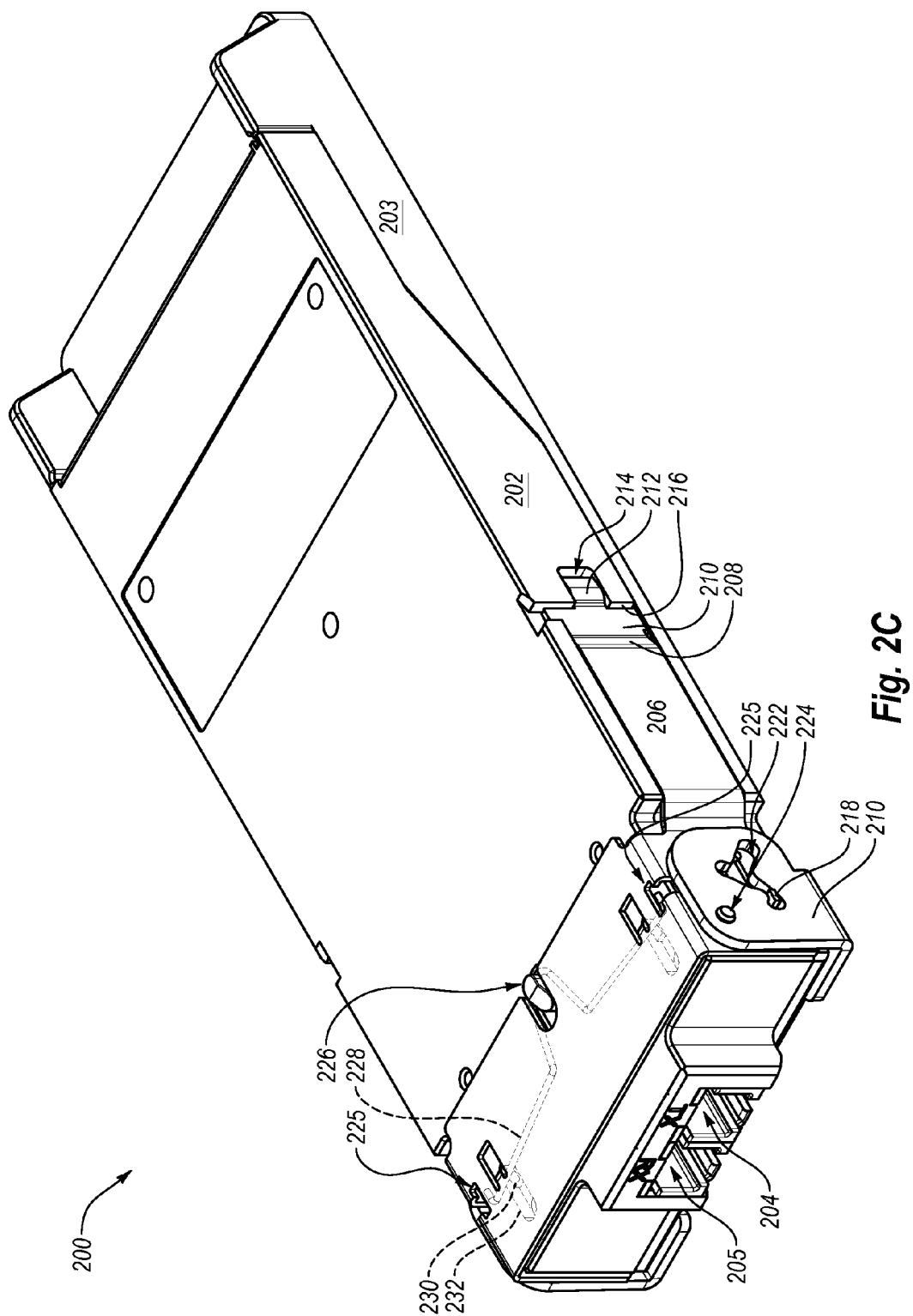
FIG. 2C is a bottom perspective view of the example optoelectronic module of FIG. 2A.
Figure 2D:
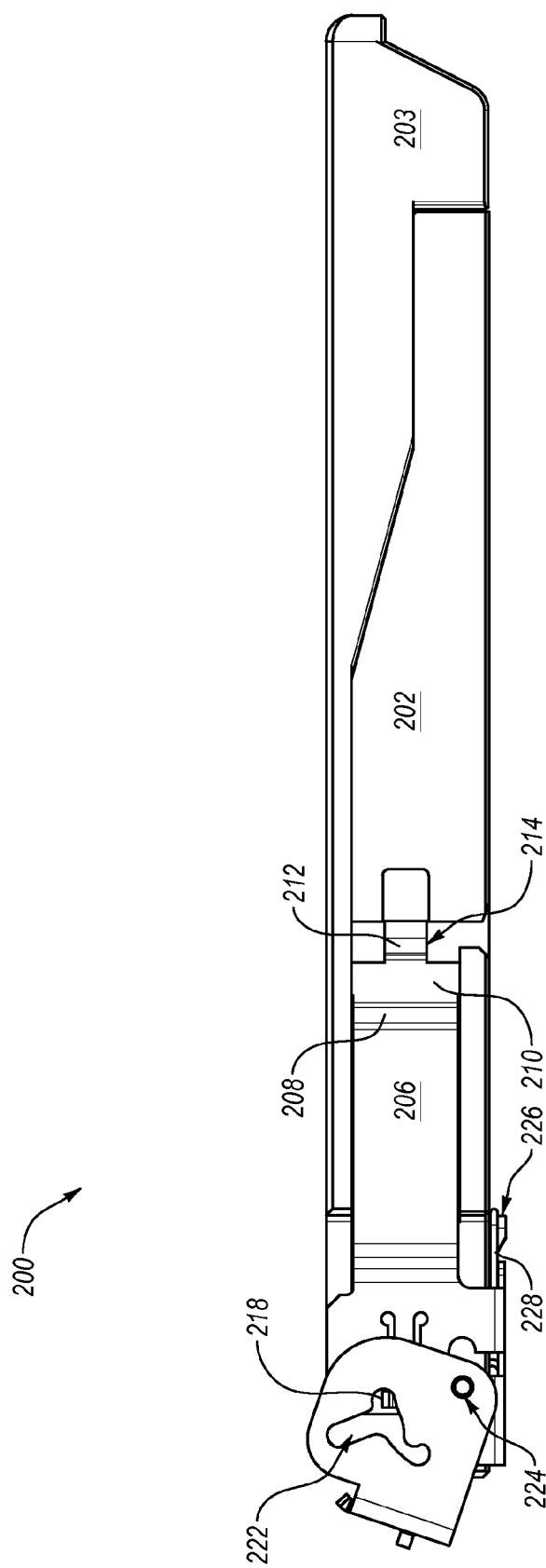
FIG. 2D is a side view of the example optoelectronic module of FIG. 2A in an unlatched configuration.
Figure 2E:
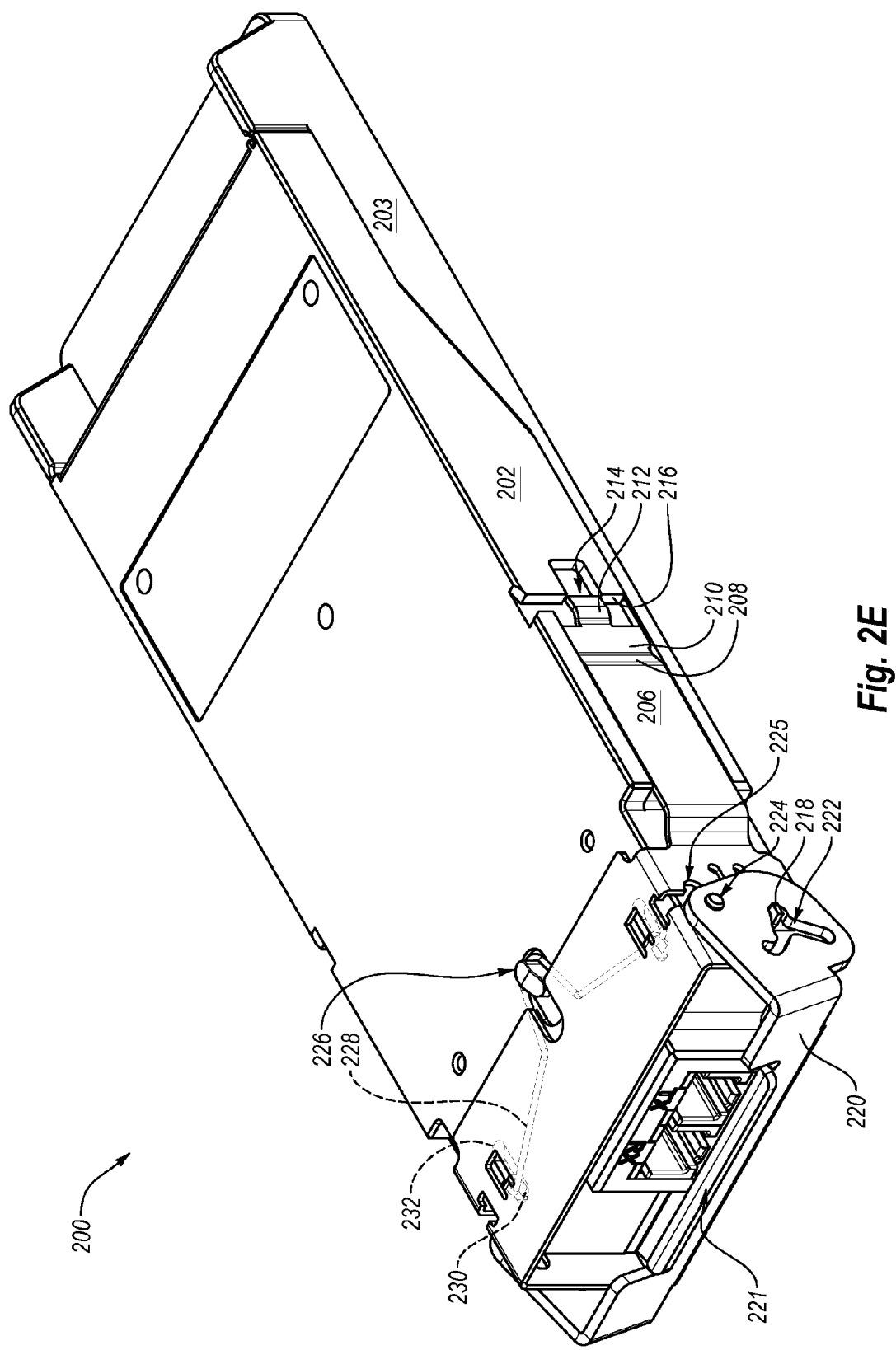
FIG. 2E is a bottom perspective view of the example optoelectronic module of FIG. 2A in an unlatched configuration.

FIG. 2C is a bottom perspective view of the example optoelectronic module 200 of FIG. 2A. As disclosed in FIG. 2C, the optoelectronic module 200 includes a resilient member 228 configured to urge the follower 206 towards the first position relative to the housing. The follower 206 includes retaining members 230 configured to at least partially retain the resilient member 228. As disclosed in FIG. 2C, the retaining members 230 may be formed from deformed portions of the follower 206 shaped to receive the resilient member 228. The retaining members 230 may allow the resilient member 228 to slide relative to the retaining members 230 as the follower 206 moves between the first position and second position relative to the housing.

The bottom housing 202 may include a protrusion 226. The protrusion 226 may retain a portion of the resilient member 228 relative to the bottom housing 202. In some embodiments, the resilient member 228 may be shaped as to be retained by the protrusion 226 without substantially sliding, as disclosed in FIG. 2C. The protrusion 226 may retain the resilient member 228 at an approximate center of the resilient member 228 while the retaining members 230 of the follower 206 may retain the ends of the resilient member 228, as disclosed in FIG. 2C. Alternately, the follower 206 may retain the resilient member 228 at an approximate center while the bottom housing 202 may retain the ends of the resilient member 228. Alternately or additionally, a differently shaped resilient member may be used.

Generally, the configuration of the resilient member 228, protrusion 226, and the retaining members 230 acts to urge the follower 206 towards the back of the optoelectronic module 200. In some embodiments, the resilient member 228 urges the follower 206 towards the back of the optoelectronic module 200 when the optoelectronic module 200 is in the latched configuration. Urging the follower 206 towards the back of the optoelectronic module when in the latched configuration may firmly seat the follower 206 and driver 220 in the latched position when the driver 220 is not being rotated.

The resilient member 228 may be substantially planar so as to allow the follower 206 to be located relatively near the bottom housing 202, as disclosed in FIG. 2C. The bottom housing 202 may include recesses 232 to at least partially receive the retaining members 230, which may further allow the follower 206 to be located relatively near the bottom housing 202.

FIGS. 2D and 2E are a side view and a bottom perspective view, respectively, of the example optoelectronic module of FIG. 2A in an unlatched configuration. To extract the optoelectronic module 200 from a host device cage such as the cage 102 shown in FIG. 1, the driver 220 is generally rotated from the latched position (shown in FIGS. 1-2C) to the unlatched position (shown in FIGS. 2D and 2E). As disclosed in FIGS. 2D and 2E, as the driver 220 is rotated to the unlatched position, biasing forces generated by the resilient member are overcome, and the follower 206 slides relative to the housing. As disclosed in FIG. 2E, the resilient member 228 is further resiliently deformed when the optoelectronic module 200 is in the unlatched configuration, as compared to the latched configuration.

The sliding of the follower 206 causes the leaf springs of the cage to slide along ramped surfaces 212, urging the leaf springs away from the center of the cage until they are located on the fingers 214. The configuration of the fingers 214 causes the leaf springs to no longer abut the shoulders 216, thus allowing the optoelectronic module 200 to be removed from the cage unhindered by the leaf springs.

As disclosed in FIG. 2E, the recesses 232 may stop the sliding progress of the follower 206 in the unlatched position by stopping the progress of the restraining members 230. Stopping the sliding progress of the follower 206 may prevent the follower 206 from coming off the optoelectronic module 200 housing. Stopping the progress of the follower 206 may also stop the progress of the driver 220 at the unlatched position.

The latching mechanism may be configured to allow optical cables (not shown) plugged into the optoelectronic module 200 to remain plugged in when the driver 220 is rotated to the unlatched position. The driver 220 may include a setback 221 to prevent the driver 220 from interfering with optical cables plugged into the optoelectronic module when the driver 220 is in the unlatched position.

Leaving optical cables plugged into the optoelectronic module 200 as the optoelectronic module 200 is removed from a host device cage may allow a removed optoelectronic module 200 to be relocated to another host device cage without inadvertently swapping the optical cables. If the removed optoelectronic module 200 is to be replaced, optical cables may be relocated to the replaced optoelectronic module 200 directly from the removed optoelectronic module 200, possibly speeding up the replacement process and/or reducing the likelihood of swapping the optical cables.

Figure 3:
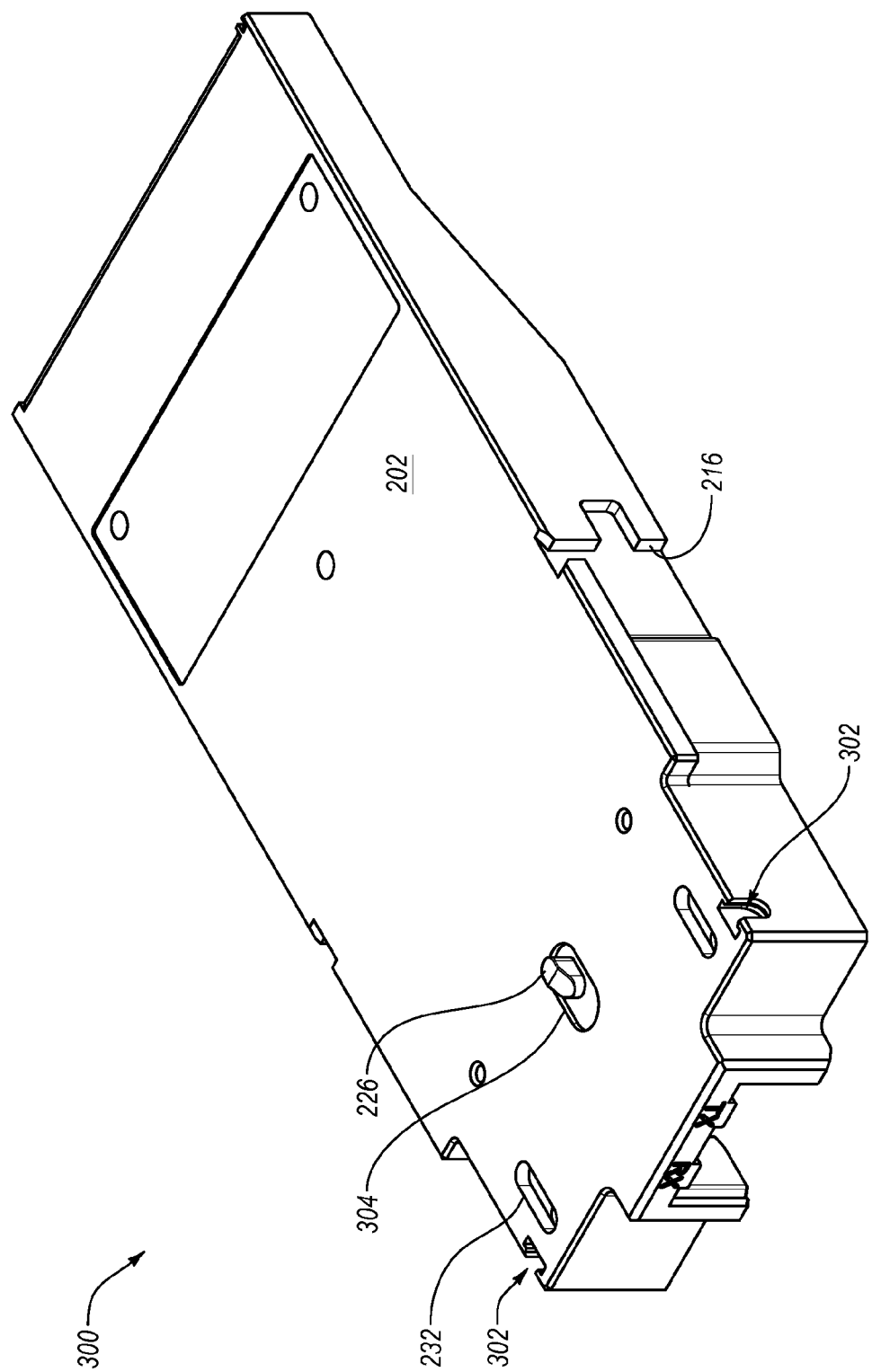
FIG. 3 is a bottom perspective view of an example bottom housing of the example optoelectronic module of FIG. 2A.
Figure 4:
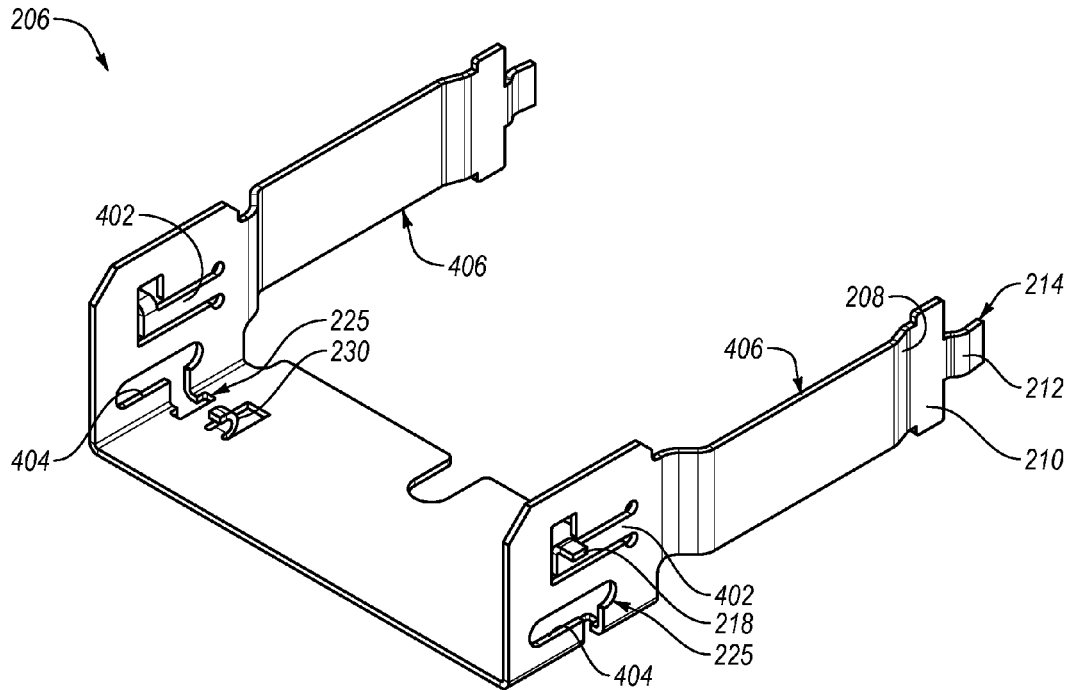
FIG. 4 is a top perspective view of an example follower of the example optoelectronic module of FIG. 2A.

FIG. 3 is a bottom perspective view of the example bottom housing 202. FIG. 4 is a top perspective view of the example follower 206, and FIG. 6 is a top perspective view of the example driver 220, all of the example optoelectronic module 200 of FIG. 2A.

Figure 6:
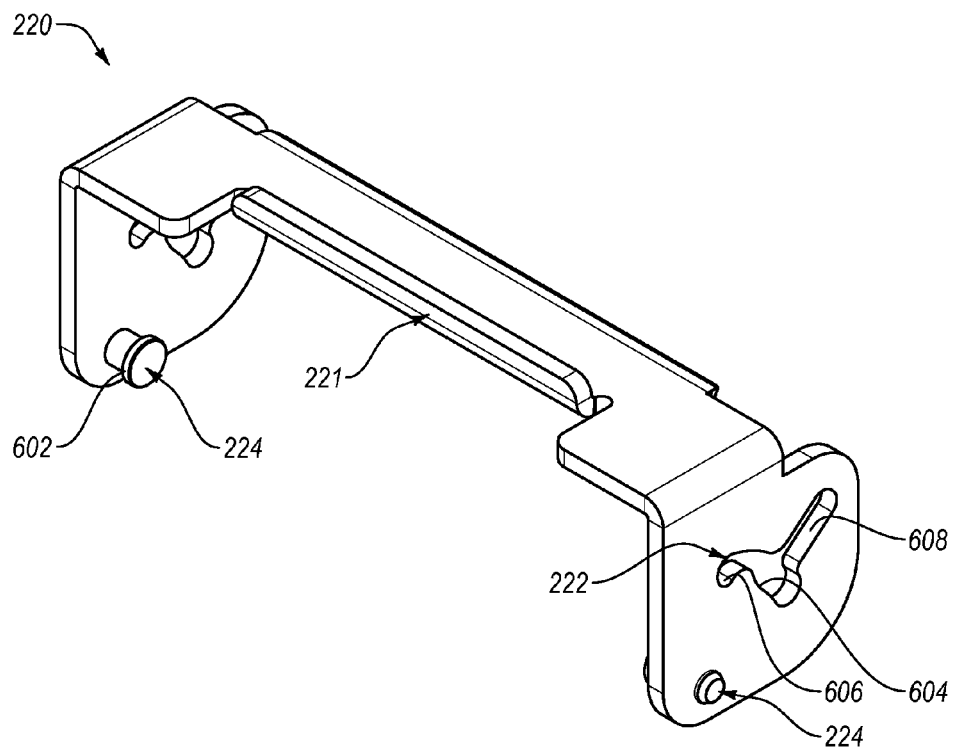
FIG. 6 is a top perspective view of an example driver of the example optoelectronic module of FIG. 2A.

With reference to FIGS. 3, 4 and 6, during assembly of the latching mechanism the interfacing protrusions 218 of the follower 206 may be inserted into the interfacing openings 222 of the driver 220. The follower 406 may include resilient arms 402 that allow the interfacing protrusions 218 to be urged together such that the interfacing protrusions 218 may be inserted into the interfacing openings 222.

During operation, the interfacing protrusions 218 may slide along the cam surfaces 604 of the interface openings 222 as the driver 220 is rotated between a latched and unlatched position. The interfacing protrusions 218 may also sit against detents 606 when the driver 220 is in the latched position. During assembly, the interfacing protrusions 218 may be located within the assembly recesses 608 of the interfacing openings 222 such that the driver 220 and follower 206 may be manipulated to bring the flanged protrusions 224 through the openings 225 of the follower 206.

As disclosed in FIG. 6, the flanged protrusions 224 may include flanges 602. As disclosed in FIGS. 2C, 2E, and 4, the openings 225 may be appropriately sized to allow a profile of the flanged protrusions 224 to pass through. During operation, sliding portions 404 of the openings 225 allow the follower 206 to move relative to the flanged protrusions 224.

Also during assembly, the follower 206 may be positioned near but apart from the bottom housing 202 and the resilient member (not shown) may be inserted into the retaining members 230 of the follower 206 and placed behind the protrusion 226 of the bottom housing 202. In some embodiments, the bottom housing 202 may include an indentation 304 around or near the protrusion 226 to assist with positioning and/or restraining the resilient member during assembly. As the follower 206 is positioned near but apart from the bottom housing 202, the flanged protrusions 224 may be inserted into flanged openings 302 of the bottom housing 202. As shown in FIG. 3, the flanged openings 302 are configured to prevent the flanged protrusions 224 from pulling away from the bottom housing 202 along the axes of the flanged protrusions 224. In some embodiments, the flanged openings 302 retain the flanged protrusions 224 against movement in multiple directions. In some embodiments, the follower 206 may further retain the flanged protrusions 224 against movement in some directions. For example, in a fully assembled optoelectronic module, the follower 206 may retain the flanged protrusions 224 against exiting the flanged openings 302 in the direction the flanged protrusions 224 entered the flanged openings 302.

To finish assembly, the follower arms 406 can be flexed outward such that the follower 206 can be moved to its assembled position on the bottom housing 202 while maintaining the position of the resilient member within the retaining members 230 and behind the protrusion 226. The top housing (not shown) can then be attached to bottom housing 202.

Figure 5:
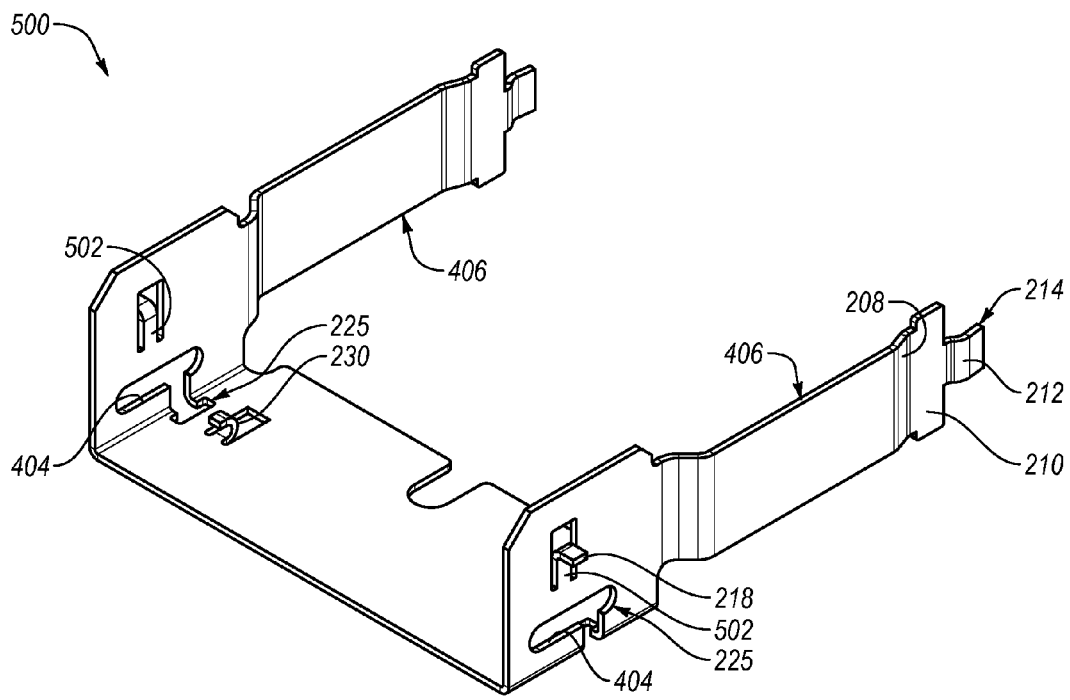
FIG. 5 is a top perspective view of another example follower.

FIG. 5 is a top perspective view of another embodiment of an example follower 500. The example follower 500 may generally correspond to the follower 206. However, the follower 500 may include alternate resilient arms 502 generally similar in function to the resilient arms 402 disclosed with reference to FIG. 4.

Figure 7:
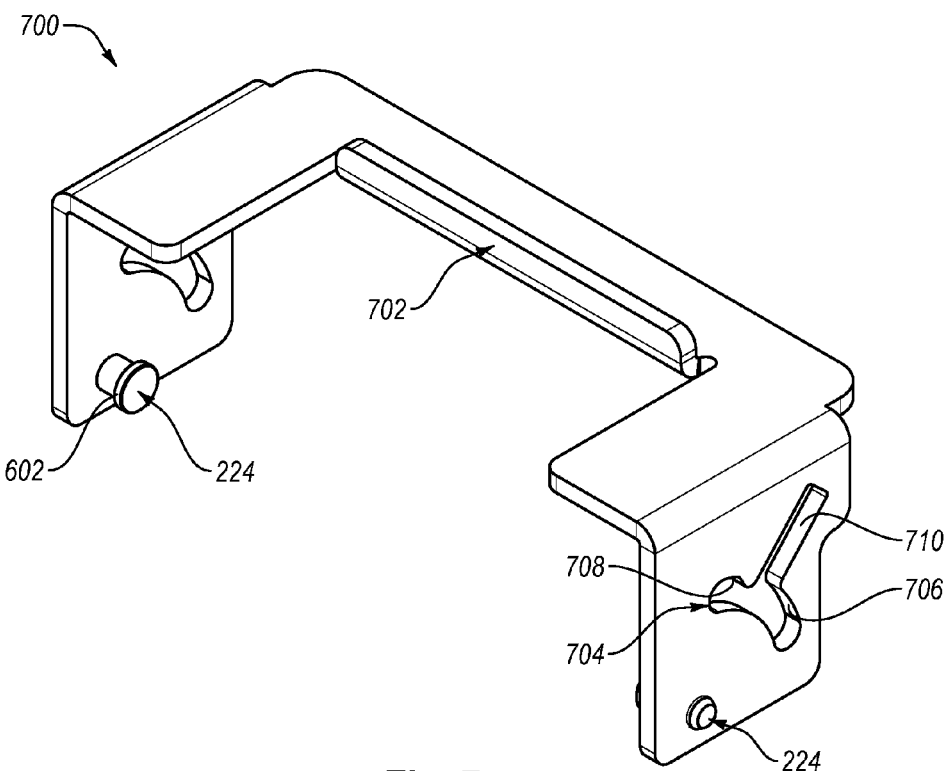
FIG. 7 is a top perspective view of another example driver.

FIG. 7 is a top perspective view of another embodiment of an example driver 700. The example driver 700 may generally correspond to the driver 220. However, the driver 700 may include a deeper setback 702 and differently configured interface openings 704. The interface openings 704 may include cam surfaces 706, detents 708, and assembly recesses 710 generally similar in function to the cam surfaces 604, detents 606, and assembly recesses 608 disclosed with reference to interface openings 222.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A module latch mechanism comprising:
a follower configured to be slidingly positioned relative to a housing and to facilitate selective engagement of the housing with a host device, the follower including a retaining member configured to retain a resilient member in at least one direction such that the resilient member urges the follower towards a first position relative to the housing; and
a driver configured to be rotatingly positioned relative to the housing, the driver including:
a cam configured to urge the follower towards a second position relative to the housing as the driver is rotated from a latched position to an unlatched position; and
a flanged protrusion configured to be received by a flanged opening of the housing.

2. The module latch mechanism of claim 1, wherein the flanged opening is configured to at least partially retain the flanged protrusion relative to the housing.

3. The module latch mechanism of claim 1, wherein the follower forms an opening configured to allow the flanged protrusion to pass through the opening.

4. The module latch mechanism of claim 3, wherein the opening formed by the follower is further configured to allow the follower to slidingly move relative to the flanged protrusion as the follower moves between the first position and second position relative to the housing.

5. The module latch mechanism of claim 4, wherein the opening formed by the follower is further configured to at least partially retain the flanged protrusion relative to the housing.

6. The module latch mechanism of claim 5, wherein:
the flanged opening is configured to at least partially retain the flanged protrusion, and
the opening and the flanged opening are together configured to substantially retain the flanged protrusion relative to the housing.

7. The module latch mechanism of claim 3, the opening further includes an assembly recess, wherein the assembly recess is configured to allow the follower and driver to be manipulated such that the flanged protrusion passes through the opening.

8. The module latch mechanism of claim 1, wherein the resilient member is substantially planar.

9. The module latch mechanism of claim 8, wherein the resilient member is a wire spring.

10. The module latch mechanism of claim 1, wherein the follower includes an interfacing protrusion configured to interface with the cam such that the follower is urged towards the first position relative to the housing by way of the interfacing protrusion.

11. The module latch mechanism of claim 10, wherein:
the cam is formed from a surface of an interfacing opening,
the interfacing protrusion is received, at least in part, within the interfacing opening, and the cam is shaped to engage the interfacing protrusion as the driver is rotated from the latched position to the unlatched position such that the follower is urged towards the second position relative to the housing.

12. The module latch mechanism of claim 10, wherein:

the cam is formed from a surface of an interfacing opening, the interfacing protrusion is received, at least in part, within the interfacing opening, and the cam is shaped to engage the interfacing protrusion as the driver is rotated from the unlatched position to the latched position such that the follower is urged towards the first position relative to the housing.

13. The module latch mechanism of claim 10, wherein the follower includes a resilient arm attached to the interfacing protrusion such that the interfacing protrusion is configured to be selectively located within the interfacing opening.

14. The module latch mechanism of claim 1, wherein the retaining member is further configured to be slidingly received within a recess of the housing.

15. The module latch mechanism of claim 14, wherein the retaining member is further configured to be restrained by the recess of the housing when the driver is in the unlatched position.

16. An optoelectronic module including the module latch mechanism of claim 1.

17. A module comprising:

a housing including:
 a protrusion; and
 a flanged opening;

a substantially planar resilient member; and a module latch including:

a follower configured to be slidingly positioned relative to the housing and to facilitate selective engagement of the housing with a host device, the follower including:
 a retaining member, and
 an interfacing protrusion; and a driver configured to be rotatingly positioned relative to the housing, the driver including:
 a cam configured to interface with the interfacing protrusion of the follower such that the driver urges the follower towards a second position relative to the housing as the driver is rotated from a latched position to an unlatched position; and
 a flanged protrusion, wherein the flanged opening of the housing is configured to at least partially retain the flanged protrusion relative to the housing, wherein the protrusion of the housing and the retaining member of the follower are configured to retain portions of the resilient member such that the resilient member urges the follower towards a first position relative to the housing and is resiliency deformed as the follower is urged towards the second position relative to the housing.

18. The module of claim 17, wherein the follower further includes an opening configured to:
 allow the flanged protrusion to pass through the opening, and
 allow the follower to slidingly move relative to the flanged protrusion as the follower moves between the first position and second position relative to the housing.

19. The module of claim 17, wherein the resilient member is a wire spring.

\* \* \* \* \*